J. M. TOWLE.
HOSE COUPLING.
APPLICATION FILED DEC. 24, 1919.
1,383,583.
Patented July 5, 1921.
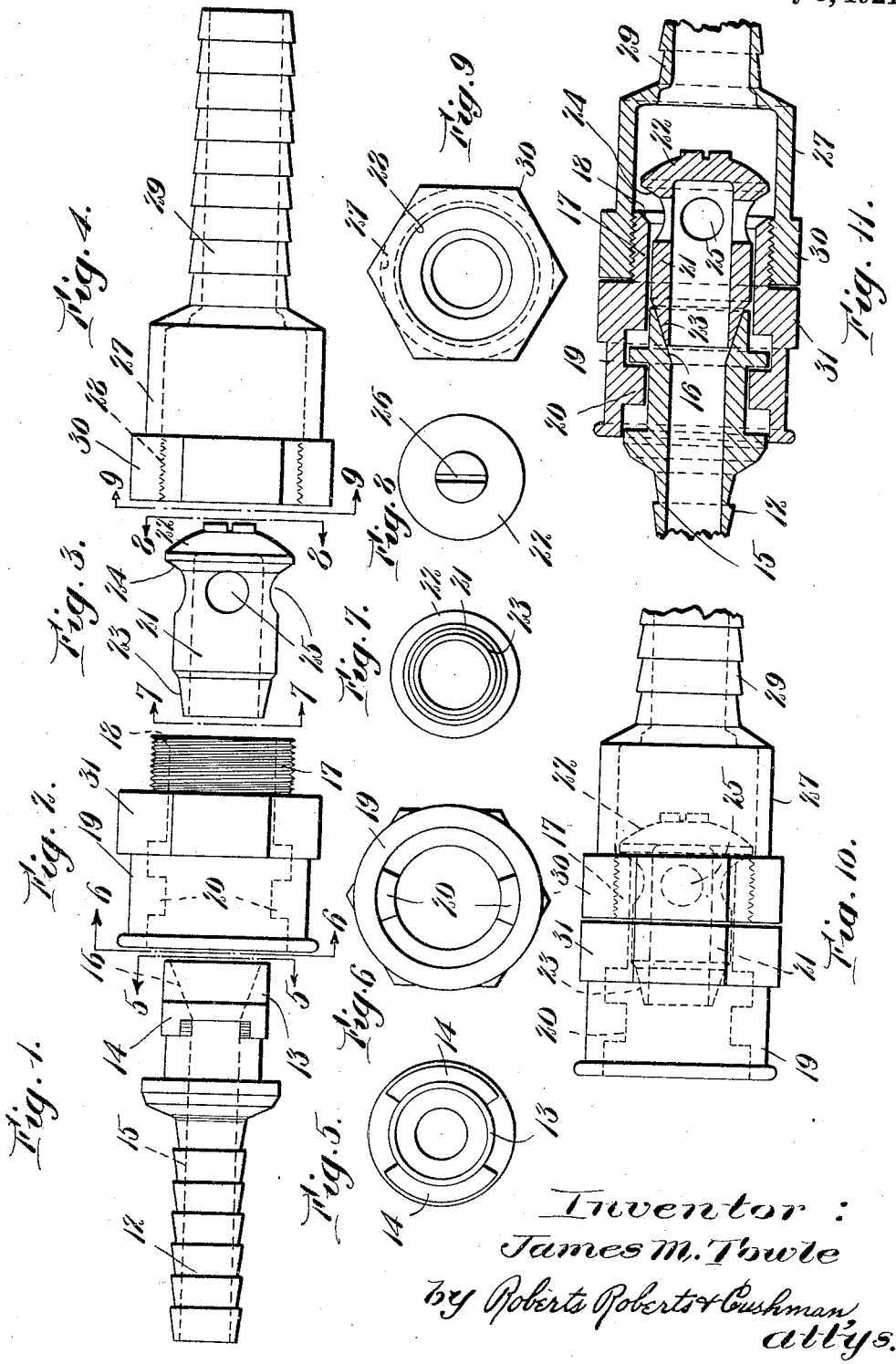
Inventor:
James M. Towle
by Roberts Roberts & Cushman
att'ys.

UNITED STATES PATENT OFFICE.

JAMES M. TOWLE, OF WEST SOMERVILLE, MASSACHUSETTS, ASSIGNOR OF ONE-HALF TO LOUIS I. BECKWITH, OF BOSTON, MASSACHUSETTS.

HOSE-COUPLING.

1,383,583.   Specification of Letters Patent.   Patented July 5, 1921.

Application filed December 24, 1919. Serial No. 347,079.

*To all whom it may concern:*

Be it known that I, JAMES M. TOWLE, a citizen of the United States of America, and resident of West Somerville, in the county of Middlesex and State of Massachusetts, have invented new and useful Improvements in Hose-Couplings, of which the following is a specification.

This invention relates to hose couplings particularly adapted for use in pressure hose lines such as are used in connection with pneumatic tools and the like.

It is an object of the invention to provide a coupling which is simple and positive in its action, and which may be readily coupled or uncoupled but which is not subject to accidental uncoupling.

It is a further object of the invention to provide a connection with such a coupling, an improved valve automatically operated through the action of coupling or uncoupling.

It is an additional object of the invention to provide a coupling wherein there is an air-tight connection between the valve and the coupling member and wherein such connection is automatically maintained without the use of springs or similar parts subject to breakage or misplacement.

It is also an object of the invention to provide a combined valve and hose coupling which is composed of but few and strong parts, simple and economical to manufacture.

I have shown a preferred embodiment of my invention in the accompanying drawings, in which—

Figure 1 is a side elevation of the coupling member;

Fig. 2 is a side elevation of the connector member;

Fig. 3 is a side elevation of the valve member;

Fig. 4 is a side elevation of the receiver member;

Fig. 5 is an end elevation of Fig. 1 as seen from the line 5—5;

Fig. 6 is an end elevation of Fig. 2 as seen from the line 6—6;

Fig. 7 is an end elevation of Fig. 3 as seen from the line 7—7;

Fig. 8 is an end elevation of Fig. 3 as seen from the line 8—8;

Fig. 9 is an end elevation of Fig. 4 as seen from the line 9—9;

Fig. 10 is an assembly elevation showing the connector, and receiving members, the latter being partly broken away, and with the valve member indicated in dotted lines; and Fig. 11 is an assembly longitudinal section with the coupling and receiving members partly broken away.

The coupling member, shown in Figs. 1 and 5, comprises a ridged hose receiving portion 12, and a cylindrical portion 13 adapted to fit into the connector member. The cylindrical portion carries the oppositely placed lock lugs 14. The coupling member has a cylindrical opening 15 therethrough, one end of which is beveled at 16, as best shown in Fig. 11, to fit the beveled end of the valve member.

The connector member, shown in Figs. 2 and 6, comprises a reduced tubular screw-threaded portion 17 adapted to screw into the receiver member, and having a valve seat 18 therein, and an enlarged cup-shaped portion 19 adapted to receive the coupling member and carrying the lock lugs 20 adapted to coöperate with the lock lugs 14 of the coupling member.

The valve member shown in Figs. 3, 7 and 8, comprises tubular portion 21 adapted to fit into the tubular portion 17 of the connector member and a solid head 22. The end of the tubular portion is beveled at 23 to fit the corresponding bevel 16 of the coupling member. The valve member has a beveled portion 24 where the tubular body joins the solid head, this bevel fitting the valve seat 18 on the connector member. A plurality of openings 25 lead from the tubular cavity in through the side of the valve member adjacent the solid head. The solid head as shown, is provided with the cross slot 26 so that it may be turned by a screw driver or similar tool in grinding it to fit into the valve seat.

The receiver member, shown in Figs. 4 and 9, comprises an enlarged cup-shaped portion 27, screw-threaded at 28 to receive the connector member and with a reduced tubular portion 29 which is shown by way of example as adapted to be fitted into a hose. Obviously this portion may be formed adapted to fit a manifold or fitting of any usual type. The receiver member and connector members together form a casing for the valve member. The meeting portions of the receiver and connector members have preferably a hexagonal form as indicated at 30 and 31, in order that they may be screwed together with wrenches.

The air or other gas or fluid under pressure normally comes from the right of Figs. 10 and 11 hence its thrust against the solid head 22 of the valve member will keep that valve seated as indicated in dotted lines in Fig. 10 and no pressure will pass through. After the coupling member is inserted into the portion 19 of the connector member it is rotated approximately a quarter turn to interlock the lugs 14 with the lugs 20. The coupling member, as shown in Fig. 11, operates to push the valve member from its seat, the beveled portion 23 of the valve member closely interfitting in the beveled portion 16 of the coupling member. Since the air passes through the valve member into the coupling member, this air-tight interfit between the surfaces 16 and 23 of these two members is highly important, in that it prevents the escape of pressure therebetween. The air or other fluid pressure against the solid head 22 will maintain the connection tight through the cone-shaped interlock between the valve and coupling members.

The air under pressure now passes from the receiver member through the openings 25 into the valve member and out through the coupling member. The receiver member would normally be connected to the source of pressure and the coupling member to the pneumatic tool or other device utilizing the pressure. When the coupling member is disconnected the valve is automatically closed by the air pressure.

The conformation of the interior of the cup of the receiver member is such that should the pressure temporarily fail, the valve member cannot become so unseated as not to operate when the pressure is on again.

It will be noted that my combined coupling and valve is entirely automatic in its valve action and contains no springs or small parts likely to become lost or broken. It consists of but four simple and strong parts, which may be easily and quickly assembled or disassembled.

My device is particularly adapted for use in connection with air pressure lines for use with pneumatic tools. In such lines it may be used to connect various lengths of hose and also used to connect a tool to a hose line. In working with the valveless screw couplings now in use, when changing tools it is often necessary for an operator to travel several hundred feet to reach a valve and cut off the pressure. Often on shipyard or similar work such travel will require an arduous climb. Or instead of making such a trip the operator will often kink the air hose to cut off the pressure with consequent deleterious effect on the hose. Both of these difficulties are obviated by the use of the present device.

Another important point in connection with my invention lies in the fact that its use in connection with hose sections permits pressure to be in the hose at all times up to the end of the line. This facilitates the work and also renders the hose less liable to kink.

My combined valve and coupling is entirely self-contained and presents a comparatively smooth outer surface so that it will not catch and cause trouble when moving hose lines about, such as would be the case in the use of valves with handles for manual operation. My valve is automatic in its action and requires no attention from the operator in its use.

While I have described my invention in connection with one particular use, it is to be understood that it is equally applicable to all lines carrying any gas or fluid under pressure.

I claim:

1. A device of the class described comprising a receiver member a portion of which forms an enlarged cup screw threaded internally, a tubular connector member having an end adapted to screw into the screw threaded cup of the receiver member, and an enlarged cup shaped portion, a valve seat formed in the connector member, a cylindrical valve fitting closely in said tubular connector, said valve having an enlarged closed head with a shoulder formed thereon adapted to fit the valve seat in the connector member, having an externally beveled opposite end, and having a longitudinally extending cylindrical cavity therein, a plurality of openings extending from said cavity through the side of the valve member, said openings being closed by the connector member when the valve is seated, the enlarged cup shaped portion of the connector having oppositely placed internally extending lugs, and a tubular coupling member, one end of which is adapted to fit into the connector member, and is internally beveled to fit the beveled portion of the valve member, the median portion of the coupling member having oppositely extending external lugs adapted to pass between and beyond the internally extending lugs of the connector member, and to be locked behind said lugs when the coupling member is given a quarter turn.

2. A device of the class described comprising a receiver member a portion of which forms an enlarged cup screw threaded internally, a tubular connector member having an end adapted to screw into the screw threaded cup of the receiver member and an enlarged cup shaped portion, a valve seat formed in the connector member, a cylindrical valve fitting closely on said tubular connector, said valve having an enlarged closed head with a shoulder formed thereon adapted to fit the valve seat in the connector member, having an externally beveled opposite end, and having a longitudinally extending cylindrical cavity therein, a plurality of openings extending from said cavity through the side of the valve member, said openings being closed by the connector member when the valve is seated, the enlarged cup shaped portion of the connector having oppositely placed internally extending lugs, and a tubular coupling member, one end of which is adapted to fit into the connector member, and is internally beveled to fit the beveled portion of the valve member, the median portion of the coupling member having oppositely extending external lugs adapted to pass between and beyond the internally extending lugs of the connector member, and to be locked behind said lugs when the coupling member is given a quarter turn, the valve member being unseated by the coupling member when the latter is in its locked position.

3. A device of the class described comprising a receiver member, a reduced portion of which is adapted to be connected to the pressure source, the opposite end of said receiver member being an enlarged cup, screw threaded internally, a tubular connector member having a reduced end adapted to screw into the screw threaded cup of the receiver member, and an enlarged cup shaped portion, a valve seat formed in the reduced end of the connector member, a cylindrical valve fitting closely in said tubular connector, said valve having an enlarged closed head with a shoulder formed thereon adapted to fit the valve seat in the connector member, the external portion of the opposite end of the valve member being beveled, the valve member having a longitudinally extending cylindrical cavity therein, a plurality of openings extending from said cavity through the side of the valve member, said openings being closed by the connector member when the valve is seated, and said beveled end of the valve member extending into the enlarged cup-shaped portion of the connector member, said enlarged cup-shaped portion having oppositely placed internally extending lugs, and a tubular coupling member, one end of which is adapted to be connected to a hose, the opposite end of which is adapted to fit into the connector member, and is internally beveled to fit the beveled portion of the valve member, the median portion of the coupling member having oppositely extending external lugs adapted to pass between and beyond the internally extending lugs of the connector member, and to be locked behind said lugs when the coupling member is given a quarter turn, the valve member being unseated by the coupling member when the latter is in its locked position.

Signed by me at Boston, Massachusetts, this 20 day of December, 1919.

JAMES M. TOWLE.